US010696282B2

(12) United States Patent
Huang

(10) Patent No.: US 10,696,282 B2
(45) Date of Patent: Jun. 30, 2020

(54) CONCENTRIC MECHANISM ELECTRIC BRAKE BOOSTER AND MASTER CYLINDER ASSEMBLY

(71) Applicant: STEERING SOLUTIONS IP HOLDING CORPORATION, Saginaw, MI (US)

(72) Inventor: Zhenzhou Huang, Midland, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 168 days.

(21) Appl. No.: 15/635,973

(22) Filed: Jun. 28, 2017

(65) Prior Publication Data
US 2018/0001881 A1 Jan. 4, 2018

Related U.S. Application Data

(60) Provisional application No. 62/357,522, filed on Jul. 1, 2016.

(51) Int. Cl.
B60T 13/74 (2006.01)
B60T 7/04 (2006.01)
B60T 8/17 (2006.01)
B60T 13/66 (2006.01)
F15B 7/08 (2006.01)
F16H 25/22 (2006.01)
F16H 35/18 (2006.01)
F16H 25/20 (2006.01)

(52) U.S. Cl.
CPC ............ B60T 13/745 (2013.01); B60T 7/042 (2013.01); B60T 8/17 (2013.01); B60T 13/66 (2013.01); F15B 7/08 (2013.01); F16H 25/2204 (2013.01); F16H 35/18 (2013.01); F16H 2025/2096 (2013.01)

(58) Field of Classification Search
CPC .......... B60T 13/745; B60T 13/66; B60T 8/17; B60T 7/042; F16H 25/2204; F16H 2025/2096; F15B 7/08
USPC ................................ 303/3; 60/545, 538, 594
See application file for complete search history.

(56) References Cited

U.S. PATENT DOCUMENTS

| 7,861,522 | B2* | 1/2011 | Obata | B60T 13/745 60/545 |
| 8,662,602 | B2* | 3/2014 | Nishino | B60T 7/042 303/122.05 |
| 8,875,508 | B2* | 11/2014 | Tsuchiya | B60T 13/746 60/538 |
| 9,180,852 | B2* | 11/2015 | Nomura | B60T 8/4077 |
| 9,278,676 | B2* | 3/2016 | Nishino | B60T 7/042 |
| 2009/0115242 | A1* | 5/2009 | Ohtani | B60T 7/042 303/3 |

(Continued)

Primary Examiner — Thomas J Williams
Assistant Examiner — Mariano Sy
(74) Attorney, Agent, or Firm — Dickinson Wright PLLC

(57) ABSTRACT

An electric booster and master brake cylinder assembly includes a master cylinder housing, a booster housing, a primary piston, and a ball screw assembly. The master cylinder housing defines a piston bore. The booster housing is attached to the master cylinder housing and defines a bore. The primary piston is slidably positioned within the piston bore and has an axially extending end portion that extends into the bore. The ball screw assembly is at least partially disposed within the bore of the booster housing.

18 Claims, 5 Drawing Sheets

(56) References Cited

U.S. PATENT DOCUMENTS

| | | | |
|---|---|---|---|
| 2010/0242469 A1* | 9/2010 | Jungbecker | B60T 13/745 60/594 |
| 2011/0314806 A1 | 12/2011 | Ishizuka | |
| 2013/0041565 A1* | 2/2013 | Fujiki | B60T 1/10 701/70 |
| 2016/0068146 A1* | 3/2016 | Matsunaga | B60T 1/10 60/545 |
| 2018/0001880 A1* | 1/2018 | Huang | B60T 7/042 |

* cited by examiner

CONCENTRIC MECHANISM ELECTRIC BRAKE BOOSTER AND MASTER CYLINDER ASSEMBLY

CROSS-REFERENCES TO RELATED APPLICATIONS

This patent application claims priority to US Provisional Patent Application Ser. No. 62/357,522, filed Jul. 1, 2016 which is incorporated herein by reference in its entirety.

BACKGROUND

The present disclosure relates generally to vehicle brake systems, and more particularly to a concentric mechanism for electrically assisting and augmenting the force applied through a push rod used to actuate a hydraulic master cylinder in a vehicle brake system.

Vehicular hydraulic brake systems, including those used in automobiles, trucks, buses, motor homes and the like, typically include a push rod actuated master cylinder which generates a hydraulic pressure that is transmitted through brake lines to actuate hydraulic brakes attached to the wheels of the vehicle, for slowing or stopping the wheels. In such systems, it is desirable to incorporate a power brake booster for amplifying or augmenting the force applied to a brake pedal connected to the push rod, so that the amount of force that an operator is required to apply to the pedal for stopping or slowing the vehicle is significantly reduced. In some of these systems, it is also desirable to enable application of a braking force independently of an operator input and/or to enable application of a braking force automatically without the necessity of an operator input.

Many existing brake systems provide the power-assist feature using engine vacuum to boost the operation of the master cylinder. In vehicles where engine vacuum is not available, such as various advanced combustion control (e.g. start/stop), hybrid electric, or all electric powered vehicles, it is desirable to electrically provide a brake boost feature that provides similar functionality as that of vacuum or other boost designs. Various electrically powered boost designs have been proposed, but these designs generally have had significant limitations, including limitations related to changing the essential brake actuation mechanism such that the manual push rod actuated brake function is no longer possible. Other electric systems have retained aspects of the manual brake function, but these designs generally undesirably extend the overall length of the combined master cylinder and electric booster thereby consuming volume under the vehicle hood.

Accordingly, it would be very advantageous and desirable to provide a push rod actuated master cylinder brake system with an electrically powered booster that retains manual push through of the system and a compact design that reduces the overall length and reduces the underhood volume.

SUMMARY

In one embodiment of the present disclosure, an electric brake boost assembly is disclosed. The assembly includes a master cylinder, a ball screw assembly, a plunger, and brake pedal push rod. The master cylinder includes a primary piston slidably positioned within a piston bore of a master cylinder housing. The ball screw assembly is arranged to actuate the primary piston in response to actuation of a motor that is drivably connected to the ball screw assembly. The ball screw assembly is arranged about a longitudinal axis and including a ball nut assembly rotatably disposed about a hollow booster screw bar. The hollow booster screw bar defines a bore that receives a hollow end portion of the piston. The plunger is slidably disposed within the hollow end portion of the piston. The plunger defines a plunger bore having a control spring disposed therein. The brake pedal push rod is slidably disposed within the plunger bore. The control spring engages an end of the brake pedal push rod and an end of the plunger. The brake pedal push rod is configured to apply a brake input force to the piston independently of the ball screw assembly.

In another embodiment of the present disclosure, an electric brake boost assembly is disclosed. The assembly includes a master cylinder housing, a booster housing, a primary piston, and a ball screw assembly. The master cylinder housing defines a piston bore that axially extends along a longitudinal axis. The booster housing is connected to the master cylinder housing and defines a bore that axially extends along the longitudinal axis. The primary piston is slidably positioned within the piston bore and has an axially extending end portion that extends into the bore. The ball screw assembly is at least partially disposed within a bore of the booster housing. The ball screw assembly includes a ball nut assembly that is rotatably disposed on a hollow booster screw bar that is disposed about the axially extending end portion.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
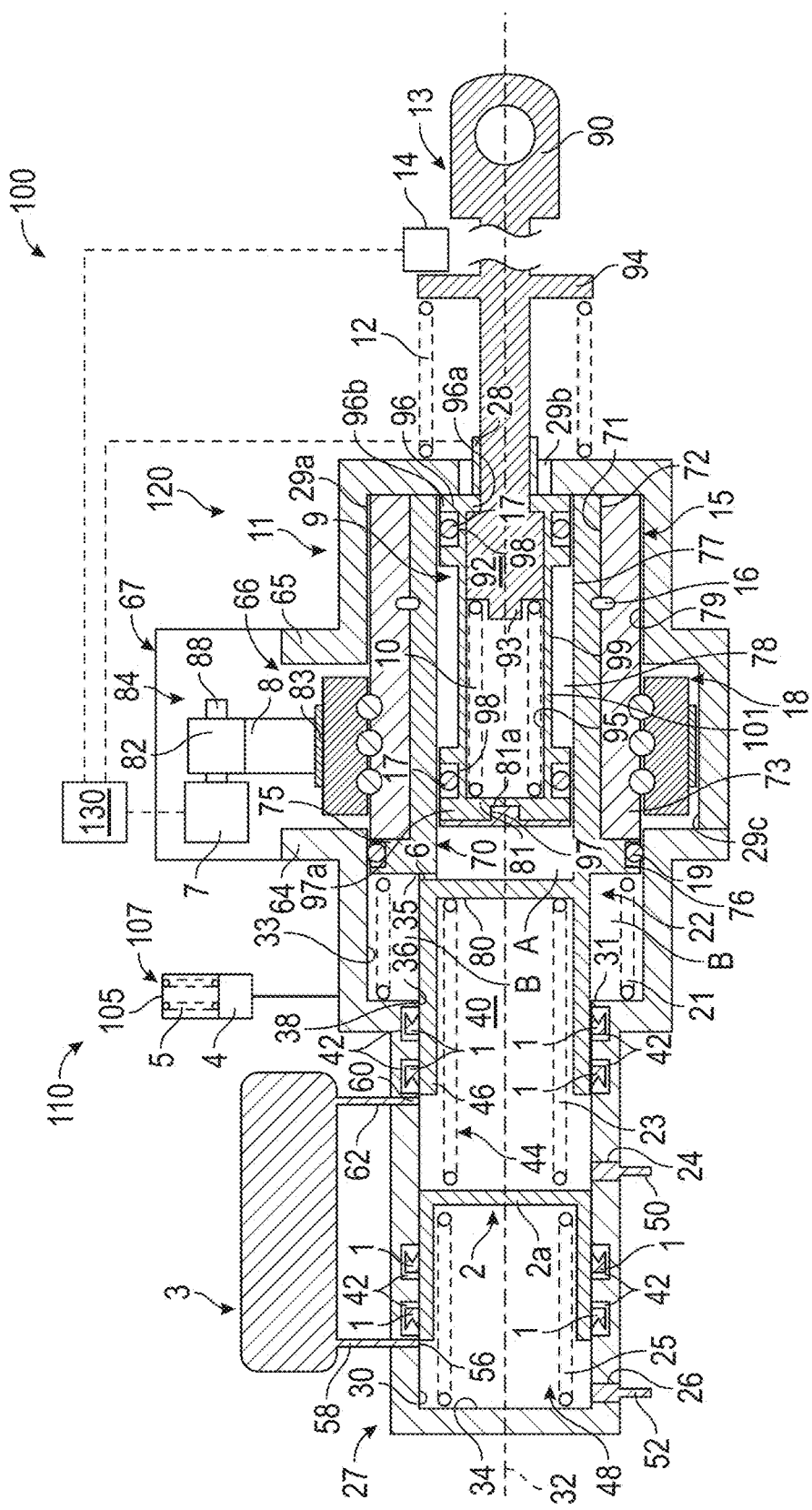
FIG. 1 is a schematic cross-sectional view of an exemplary embodiment of the concentric mechanism electric brake booster and master cylinder assembly as disclosed herein.

Referring now to the Figures, where the present disclosure will be described with reference to specific embodiments, without limiting same, wherein like elements in the various embodiments are referred to with the same reference numerals.

Figure 2:
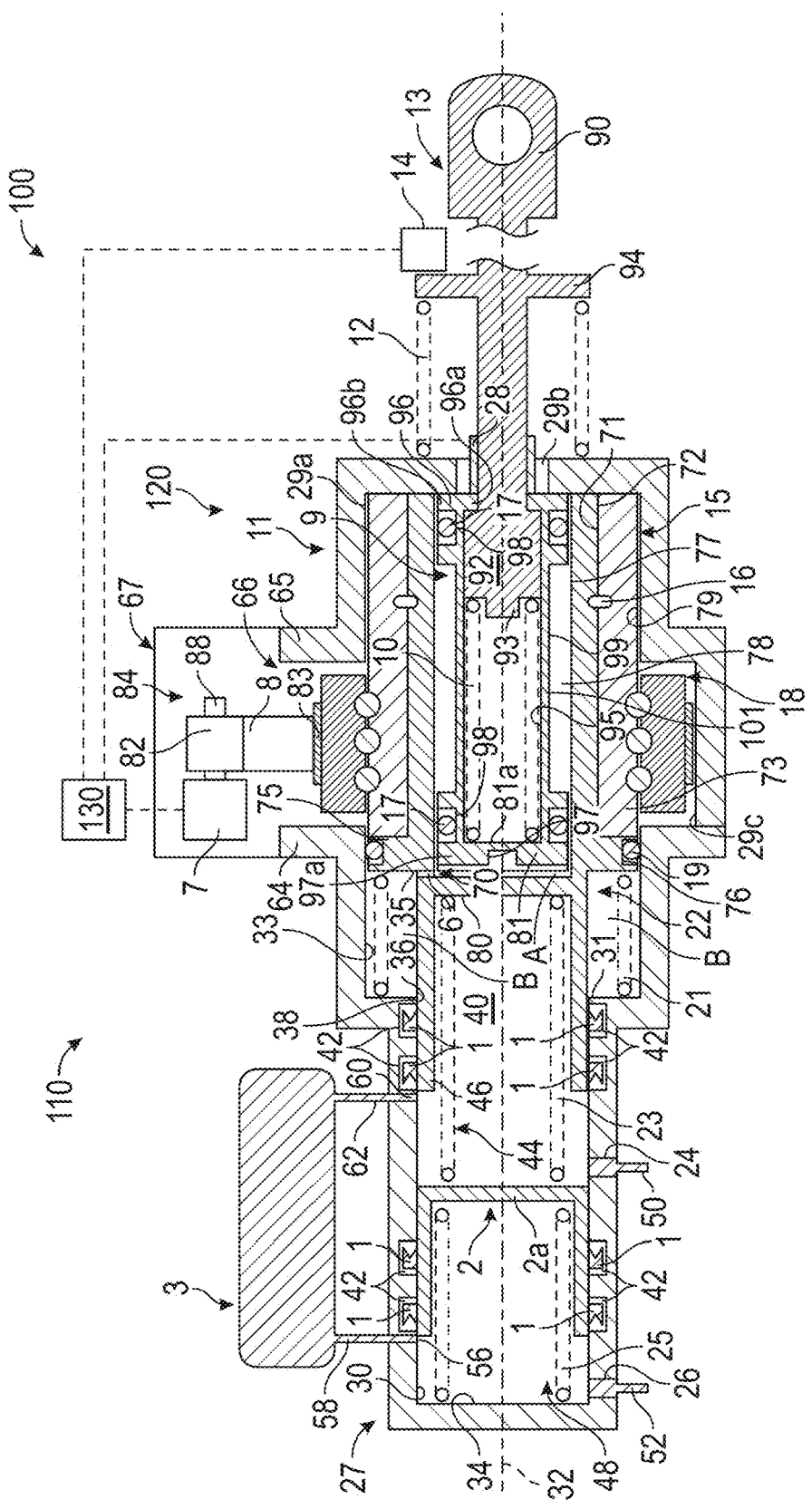
FIG. 2 is a schematic cross-sectional view of a second exemplary embodiment of the concentric mechanism electric brake booster and master cylinder assembly as disclosed herein.

An electric booster and master brake cylinder assembly 100 is disclosed. The electric booster and master brake cylinder assembly 100 is vacuum independent because electric power replaces the traditional vacuum and an electric vacuum pump may not be incorporated. In one embodiment, the electric booster and master brake cylinder assembly 100 generally includes a master cylinder 110, an electric booster 120, and a brake pedal push rod 13, as shown in FIGS. 1 and 2, for example. The electric booster and master brake cylinder assembly 100 advantageously provides a braking system and solution that incorporates a manual push through braking function and ball nut/screw-based motor power assist function in one compact electric booster package. The electric booster and master brake cylinder assembly 100 advantageously provides a push rod actuated master cylinder brake system together with an electrically powered booster, which retains manual push through of the system in a compact design that reduces the overall length and reduces the under hood volume as compared with conventional electric booster brake system designs.

The electric booster and master brake cylinder assembly 100 seen in FIGS. 1 and 2, broadly considered, includes, a motor 7 that is connected to a transmission 84 that is configured as a reduction mechanism. Transmission 84 drivably connects the motor 7 to a ball screw assembly that translates a rotary input from the motor 7 into a linear output to actuate a primary piston 22 and a secondary piston 2. In at least one embodiment, the transmission 84 drivably connects the motor 7 to a hollow end portion 70 of the primary piston 22.

The ball screw assembly is at least partially disposed within a bore of a booster housing 11. The ball screw assembly includes a ball nut assembly 18 that is rotatably disposed on a concentric and a hollow booster screw bar 15. Responsive to operation of the motor 7, the ball nut assembly 18 rotates and rotates the hollow booster screw bar 15 is arranged to translate relative to the ball nut assembly 18 along the longitudinal axis 32. The brake pedal push rod 13 enables input of a brake input force to the assembly 100. The assembly 100 allows an overall assist force to be applied to at least one piston of the master cylinder 110 as a power or booster assist force from operation of the ball nut assembly 18 and hollow booster screw bar 15 or a brake input force resulting from linear motion of the brake pedal push rod 13 or an additive combination thereof.

In one embodiment, the master cylinder 110 may be a hydraulic master cylinder that generally includes a subassembly of its components, as described herein. The electric booster 120 also generally includes a subassembly of its components, as described herein. The brake pedal push rod 13 also generally includes a subassembly of its components, as described herein. However, it will be readily understood that in other embodiments, the components of the electric booster and master brake cylinder assembly 100 may be allocated into other assemblies or subassemblies or groupings of components other than those used to describe master cylinder 110, electric booster 120, and brake pedal push rod 13 herein.

Referring to FIGS. 1 and 2, in one embodiment the master cylinder 110 includes a master cylinder housing 27, the primary piston 22, a primary piston return spring 23, the secondary piston 2, and a secondary piston return spring 25, although any of the components described below as being associated with the master cylinder 110 may be ascribed or attributed thereto. The primary piston 22 is slidably positioned within a piston bore 30 defined by the master cylinder housing 27. The primary piston return spring 23 provides a return bias or force to the primary piston 22. The secondary piston 2 is slidably positioned within the piston bore 30 and is axially disposed between a closed end 34 of the piston bore 30 and the primary piston 22. The secondary piston return spring 25 provides a return bias or force to the secondary piston 2. The components and workings of the master cylinder 110 are described further below, as well as the features that provide advantageous and unexpected benefits over conventional master cylinder subassemblies.

The master cylinder 110 also includes the axially extending piston bore 30 within the master cylinder housing 27 disposed along longitudinal axis 32. The primary piston 22, a primary piston return spring 23, a secondary piston 2, and a secondary piston return spring 25 are slidably disposed within bore 30 in the order shown in FIGS. 1 and 2. The secondary piston return spring 25 extends between and engages the closed end 34 of the piston bore 30 and a crown or head 2a of the secondary piston 2. The primary piston 22 is disposed within and partially extends from a bore opening 36 at an opposite end 38 of the piston bore 30. The primary piston return spring 23 extends between and engages a crown or head 2a of the secondary piston 2 and the piston head 80 of the primary piston 22.

The piston bore 30, as well as pistons 22, 2 may have any suitable diameter and may be sized, for example to develop a predetermined operating pressure within the brake lines 50, 52 and the other portions of the brake system described herein. At the opposite end 38 of the piston bore 30 the housing 27, a ball screw bore 33 that is configured to sealably engage an outer surface of the hollow booster screw bar 15, and the outer surface of the hollow booster screw bar 15 together with an outer surface 35 of the primary piston 22 defines a booster balance cavity B (FIG. 1) that is configured to receive fluid 40, as described herein. A shelf 31 radially extends (relative to the longitudinal axis 32) between the piston bore 30 and the ball screw bore 33. The ball screw bore 33 may have a diameter that is greater than the piston bore 30. A diameter of the ball screw bore 33 may be sized, for example to develop a predetermined operating pressure within the booster balance cavity B.

A booster return spring 21 is disposed in the ball screw bore 33 for providing a return spring bias or force against the hollow booster screw bar 15 when the bar is translated in the leftward direction (e.g. FIGS. 1 and 2) to provide an booster assist force. The booster return spring 21 extends between and engages the shelf 31 and a radially extending flange 75 of the hollow end portion 70 of the primary piston 22. While the embodiment described above includes two pistons 22, 2, other embodiments are possible and master cylinder 110 may be understood to include at least one piston and associated return spring, such as primary piston 22 and primary piston return spring 23, disposed within the piston bore 30.

The at least one piston, such as primary piston 22, is advantageously distinguished from conventional master cylinder primary pistons configurations by virtue of the fact that it includes a cylindrical, axially extending end portion 70 that is hollow and is concentrically disposed along longitudinal axis 32. The hollow end portion 70 is slidably disposed within the hollow booster screw bar 15 to transfer force to at least one of the primary piston 22 and the secondary piston 2. The hollow end portion 70 has an outer surface 71 and outer diameter that is configured to be disposed within an inner surface 72 of the hollow booster screw bar 15 that defines a bore 72a that extends completely through the hollow booster screw bar 15 along the longitudinal axis 32.

In one embodiment the hollow end portion 70 has an outer surface 71 and outer diameter that is configured to be disposed within and engaged in a slight interference condition against the inner surface 72 of the hollow booster screw bar 15. In another embodiment, the hollow end portion 70 has an outer surface 71 and outer diameter that is configured to be disposed within and matingly engaged around its periphery in an interference condition against the inner surface 72 of the hollow booster screw bar 15.

The inner surface 72 of the hollow booster screw bar 15 or the outer surface of the hollow end portion 70, or both of them, may include surface finishes or surface coatings to establish a predetermined coefficient of friction between then or a predetermined sliding force required to move the hollow end portion 70 within the hollow booster screw bar 15 in the event of the occurrence of a predetermined release condition or release mode, as described herein. The hollow end portion 70 may extend within the hollow booster screw bar 15 from a master cylinder facing end 73 to any predetermined extent, and in one embodiment will extend through the entire length of the hollow booster screw bar to an opposing end 74. The hollow end portion 70 includes a radially extending flange 75 that extends towards the ball screw bore 33. The radially extending flange 75 is configured to abut the master cylinder facing end 73 of the hollow booster screw bar 15. The radially extending flange 75 is axially disposed (relative to the longitudinal axis 32) between the piston crown 80 of the primary piston 22 and the master cylinder facing end 73 of the hollow booster screw bar 15.

The radially extending flange 75 includes a circumferentially extending recess 76 that is sized to engage and retain piston seal 19, which may be any suitable circumferential seal and comprise any suitable seal material, and which in one embodiment comprises an o-ring seal formed from an elastomeric material, including natural or synthetic rubbers. Synthetic rubbers may include any suitable thermoset or thermoplastic elastomeric polymer, including those thermoset polymers comprising BR, IIR, CSM, ECHECO, EPDM, EPR, FKM, NBR, FFKM, CR, IR, PSR, PTFE, Saniflor, SiR, or SBR, or thermoplastics polymers comprising TPE, TPO (LDPE, HDPE, LLDPE, ULDPE), TPU, TEEE, PEBA, MBR, or TPV.

In other embodiments, the radially extending flange 75 may be reduced or omitted and a seal may be incorporated into an outer surface 79 of the hollow booster screw bar 15 proximate the master cylinder facing end 73. The hollow end portion 70 also has an inner surface 77 and inner diameter that defines a plunger cavity 78 that is configured to sealably receive a plunger 9, as described herein. The inner surface 77 and inner diameter of the hollow end portion 70, the piston crown 80, and an end of the plunger 81 also defines a plunger balance cavity A (FIG. 1) that is configured to receive fluid 40.

In certain embodiments, a fixing and release mechanism 16 may be inserted between the hollow booster screw bar 15 and the hollow end portion 70. The fixing and release mechanism 16 serves to fix the hollow booster screw bar 15 and the hollow end portion 70 of the primary piston 22 to one another and prevent axial movement between them under certain predetermined fixed operating modes, which may include operating modes where assist is being provided by the electric booster 120 and motor 7 as disclosed herein. The electric booster 120 and the motor 7 are able to build up pressure faster than a traditional vacuum pump as well as provide an adjustable brake pedal feel.

The fixing and release mechanism 16 serves to release the hollow booster screw bar 15 and the hollow end portion 70 from one another enabling relative axial movement between the hollow booster screw bar 15 and the hollow end portion 70 of the primary piston 22 under certain predetermined release operating modes, which may include operating modes where assist is not being provided by the electric booster 120 and motor 7. For example, the motor 7 may not provide an assist torque when commanded, or when the motor 7 does not receive a command, or does not properly process a received command. Should one of the aforementioned operating modes occur, the fixing and release mechanism 16 may be designed to release the hollow end portion 70 from the hollow booster screw bar 15 upon receiving a brake input force through the brake pedal push rod 13 that meets or exceeds a predetermined value sufficient to overcome the holding force provided by the fixing and release mechanism 16.

The fixing and release mechanism 16 may include mechanisms that are frangible or may be destroyed or damaged upon release and designed for a single release, as well as those that are reusable and designed to enable release as described and may be reengaged to fix the positions of the hollow end portion 70 and hollow booster screw bar 15 to their original positions. The fixing and release mechanism 16 may include a capsule, or a plurality of axially-spaced capsules, that is molded in place, such as an injection molded plastic capsule or a die cast metal capsule. The capsule may have any suitable configuration, including a circumferentially extending configuration. The fixing and release mechanism 16 may be released by shearing the capsule, for example.

Figure 1A:
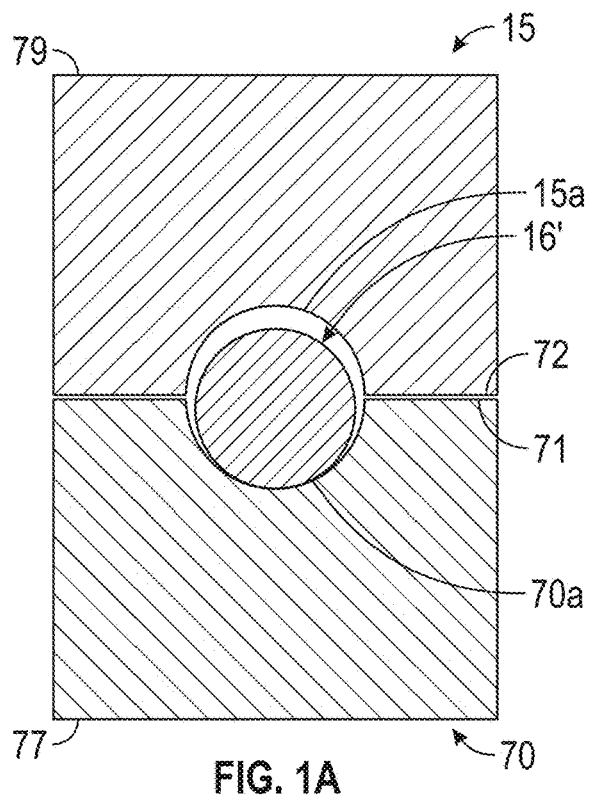
FIG. 1A is an enlarged schematic cross-sectional illustration of region A of FIG. 1 and a second embodiment of a coupling and release mechanism, as disclosed herein.

In at least one embodiment, the fixing and release mechanism 16 may be reusable and may include, for example, a compressible, circumferentially-extending seal 16' (FIG. 1A), or a plurality of axially-spaced seals 16' that may be disposed within a first groove 15a of the hollow booster screw bar 15 that extends from the inner surface 72 towards the outer surface 79 of the hollow booster screw bar 15 and a second groove 70a of the hollow end portion 70 of the primary piston 22 that extends from the outer surface 71 towards the inner surface 77 of the hollow end portion 70.

Figure 1B:
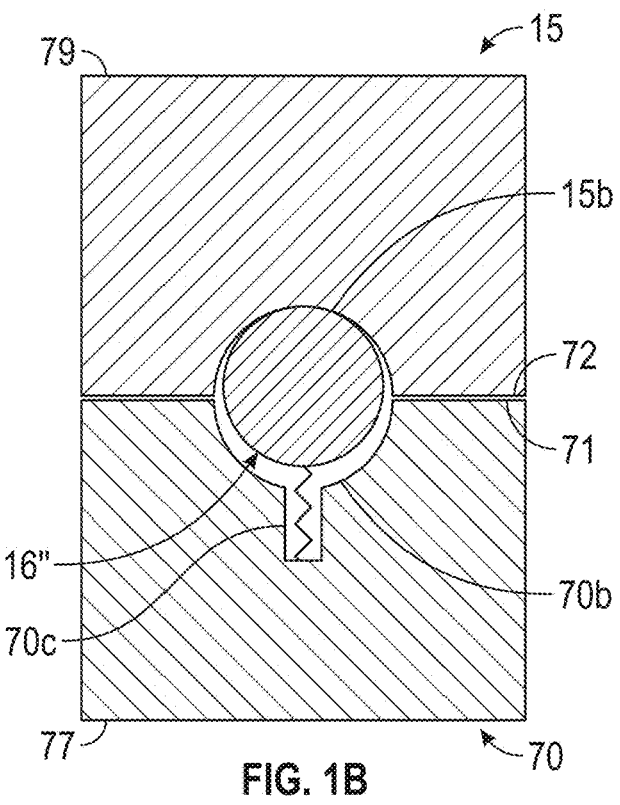
FIG. 1B is an enlarged schematic cross-sectional illustration of region B of FIG. 1 and a third embodiment of a coupling and release mechanism, as disclosed herein.

In at least one embodiment a spring-loaded detent ball 16" (FIG. 1B), or a plurality of axially- or circumferentially-spaced spring-loaded detent balls 16" that may be disposed within a first groove 15b of the hollow booster screw bar 15 that extends from the inner surface 72 towards the outer surface 79 of the hollow booster screw bar 15 and a second groove 70b of the hollow end portion 70 of the primary piston 22 that extends from the outer surface 71 towards the inner surface 77 of the hollow end portion 70. A spring of a spring-loaded detent ball 16" is disposed within a pocket 70c that extends from the second groove 70b towards the inner surface 77.

As noted, the fixing and release mechanisms 16, 16', 16" described may all be used to provide a sufficient manual braking function for a vehicle operator in the event of the unavailability of an added assist force from the electric booster, including a manual emergency brake function in such cases.

Referring to FIGS. 1 and 2, in one embodiment, the hollow end portion 70 is fixed or attached to the at least one piston, such as primary piston 22, where these components are formed separately and joined so as unitize the piston and end portion. This may be accomplished by any suitable fixing, joining, or attachment mechanism or means, such as peripherally spaced threaded fasteners, or by a peripherally extending weld that joins the piston crown 80 to the hollow end portion 70. In one embodiment, the at least one piston, such as primary piston 22, and hollow end portion 70 are formed together and comprise a single integral component. In certain embodiments (e.g. FIG. 1), the hollow end portion 70 includes a balance orifice 6 that is disposed between the flange 75 and the piston crown 80 that enables transfer of fluid 40 between the plunger balance cavity A and booster balance cavity B to maintain the same pressures within these cavities A, B, as described herein.

Figure 4:
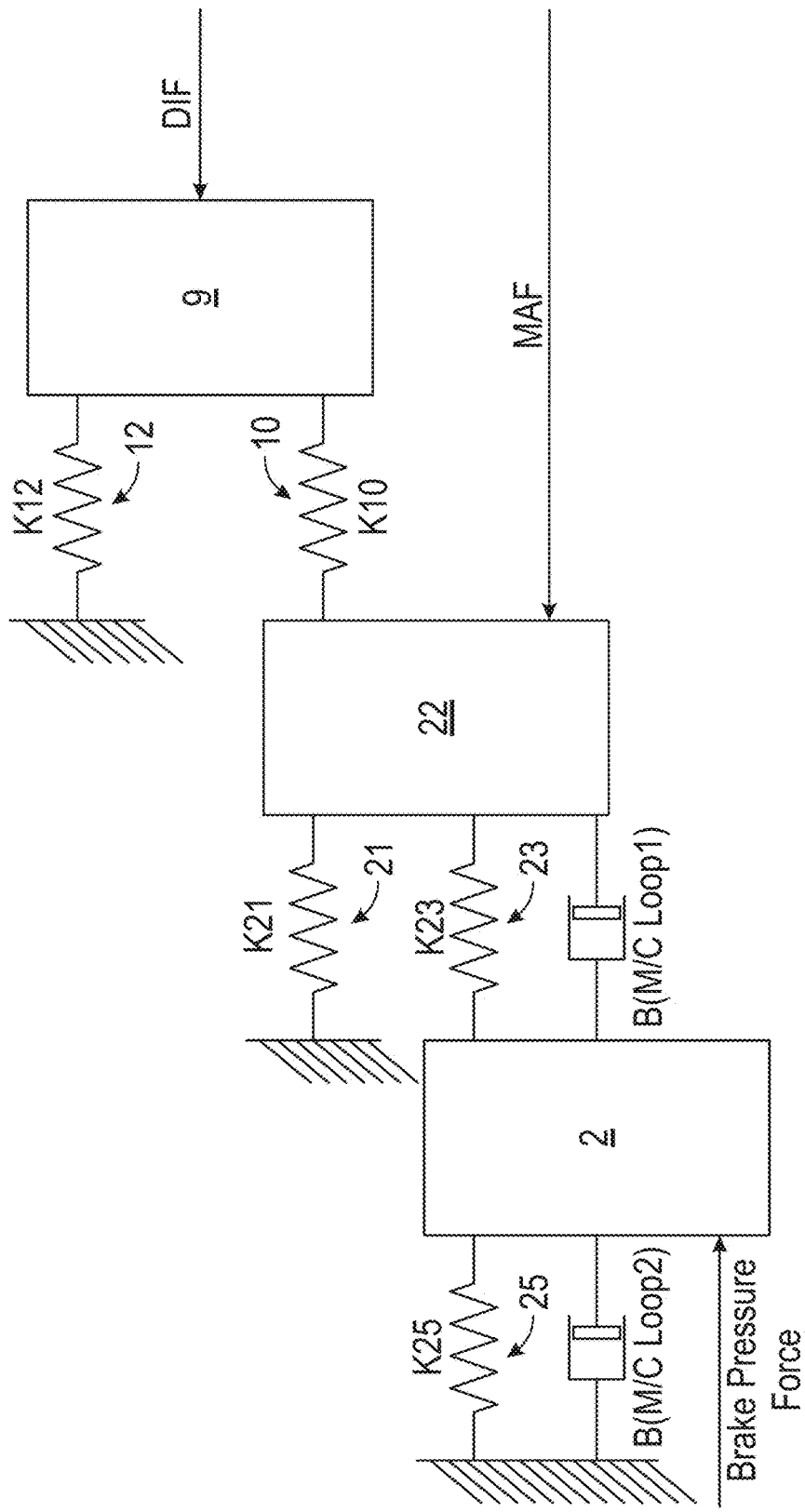
FIG. 4 is a schematic illustration of a control method for an exemplary embodiment of an electric brake booster and master cylinder assembly, as disclosed herein.

The master cylinder 110 also includes a plurality of seals 1 disposed within the piston bore 30 that seal the pistons 22, 2 within the piston bore 30 and allow the pistons 22, 2 to work against the fluid 40 disposed within the piston bore 30 and pressurize the fluid for use within the brake lines and brake system in a manner well-known in the art. Any suitable number of seals 1 may be used. In one embodiment, as shown in FIGS. 1 and 2, 4 seals are employed, with two seals disposed proximate to and engaging the primary piston 22, and two seals two seals disposed proximate to and engaging the secondary piston 2. The seals 1 are each captured or disposed within a recess 42 formed within the piston bore 30. Any suitable seal materials may be employed for seals 1, including those listed herein for piston seal 19.

The master cylinder 110 is configured to contain fluid 40 in the piston bore 30 as shown in FIGS. 1 and 2. The fluid 40 within the piston bore 30 is in fluid communication with the other components (not shown) of the brake system, such as, for example, slave cylinders, brake calipers, components of an anti-lock brake system (ABS) or electronic stability control (ESC), through brake lines 50, 52. This fluid communication is accomplished through a first outlet 24, which extends through the piston bore 30 and is disposed between a head 2a of the secondary piston 2 and an end of the primary piston 22, and brake line 50 that is in fluid communication with a first chamber 44 of the master cylinder 110 defined by the interior surface 46 of the primary piston 22 and the exposed portion of the piston bore 30 proximate thereto. Fluid communication with the brake system is also accomplished through a second outlet 26, which extends through the piston bore 30 and is disposed between the closed end 34 of the piston bore 30 and an end of the secondary piston 2, and brake line 52 that is in fluid communication with a second chamber 48 of the master cylinder 110 defined by the interior surface 54 of the secondary piston 2 and the exposed portion of the piston bore 30 proximate thereto.

The master cylinder 110 also includes a fluid reservoir 3 that is also in fluid communication with the first chamber 44 and second chamber 48 through a first port 56 and conduit 58 and second port 60 and conduit 62, respectively, in a first position of the pistons as shown in FIGS. 1 and 2, such as prior to actuation of the assembly 100. The first port 56 extends through the piston bore 30 and is disposed proximate an end of the secondary piston 2. The second port 60 extends through the piston bore 30 and is disposed proximate an end of the primary piston 22.

The master cylinder 110 may also include a flange 64, which may comprise a mounting flange for attaching the master cylinder housing 27 to a booster housing 11 using any suitable attachment means, including various threaded fasteners.

The components of master cylinder 110 can be made from any suitable materials, including materials conventionally used for these components. The master cylinder housing 27 and pistons 22, 2 may, for example, be made from various ferrous or non-ferrous metals. The master cylinder housing 27 and flange 64 can be formed in any suitable manner, including as a single integral member. The reservoir 3 can be plastic and attached to the master cylinder housing 27. As is conventional, the reservoir 3 retains and provides brake fluid. The piston bore 30 of the master cylinder housing 27 is in fluid communication with the reservoir 3 through the ports 56, 60 and associated conduits 58, 62. The pistons 22, 2 are slidably received in the piston bore 30. Movement (inward advancement) of the pistons 22, 2 (in the left direction with respect to FIGS. 1 and 2) within the piston bore 30 provides brake fluid apply pressure to the components of the brake system, as described herein, through outlets 24, 26 and associated brake lines 50,52.

Referring to FIGS. 1 and 2, in one embodiment the electric booster 120 may be described as generally including booster housing 11; motor 7; motor shaft 88; and transmission 84 having drive pulley 82, pulley or drive belt 8, driven pulley 83; ball nut assembly 18; and hollow booster screw bar 15; controller 130; and force sensor 14, and although any of the components described below as being associated with the electric booster 120 may be ascribed or attributed thereto. The components and workings of the electric booster 120 are described further below, as well as the features that provide advantageous and unexpected benefits over conventional electric booster subassemblies.

The booster housing 11 includes a first portion defining a first bore 29a and a first opening 29b and a second portion extending from the first portion defining a second bore 29c. A diameter of the second bore 29c is greater than a diameter of the first bore 29a. The first bore 29a, the first opening 29b, and the second bore 29c are all disposed about the longitudinal axis 32.

The first portion of the booster housing 11 includes a flange 65 that may abut the flange 64 of the master cylinder housing 27 to couple the booster housing 11 to the master cylinder housing 27. In at least one embodiment, an opening 66 may be defined between the booster housing 11 and the master cylinder housing 27 through which at least a portion of the transmission 84 may extend to engage the ball nut assembly 18. The opening 66 may be defined by an axial spacing apart of the flange 64 from the flange 65. Furthermore, at least a portion of the ball nut assembly 18 may be disposed within or extend into the opening 66. In at least one embodiment, a housing 67 is disposed over the opening 66, the motor 7, and a portion of the transmission 84. The housing 67 may be operatively connected to the flange 64 of the master cylinder housing 27 and the flange 65 of the booster housing 11.

The hollow booster screw bar 15 is slidably or rotatably positioned within the first bore 29a and extends into the second bore 29c and the ball screw bore 33. The brake pedal push rod 13 extends through the first opening 29b and extends into a plunger bore 95 of the plunger 9 along the longitudinal axis 32.

The motor 7 is attached to one or both of the master cylinder housing 27 and booster housing 11 to drive the transmission 84. Referring to FIGS. 1 and 2, the transmission 84 may be operatively connected to the ball nut assembly 18 and the hollow booster screw bar 15 and includes belt 8, drive pulley 82 and driven pulley 83.

Figure 3:
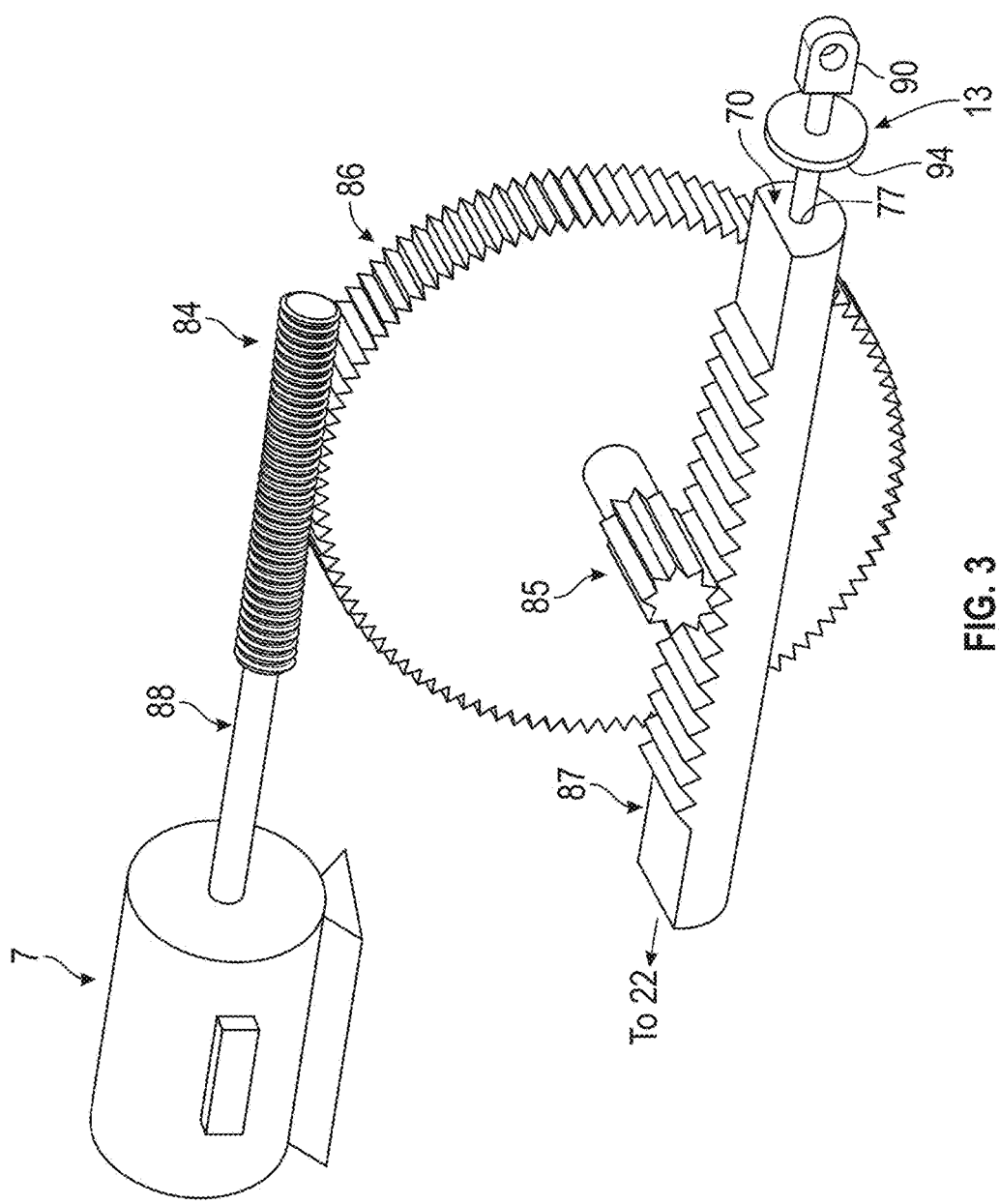
FIG. 3 is a schematic illustration of a second embodiment of a motor and rack transmission, as disclosed herein.

Referring to FIG. 3 the transmission 84 may include a rack and pinion system, including a motor shaft 88 that extends directly from the motor 7, a worm 86, a pinion gear 85 that extends from the worm 86, and a hollow rack 87. The motor shaft 88 may be configured as a worm gear that is drivably connected to the worm 86. The pinion gear 85 extends from the worm 86 and drives the hollow rack 87.

The hollow end portion 70 may be defined by the hollow rack 87 and the brake pedal push rod 13 extends into the hollow end portion 70. In at least one embodiment, the hollow booster screw bar 15 may be provided with a plurality of external teeth or protrusions that are arranged to engage teeth of the pinion gear 85, such that the hollow booster screw bar 15 is configured as a hollow rack. The worm gear, the worm 86, and the pinion gear 85 may be selected to provide a predetermined gear reduction.

Responsive to depression of a brake pedal that is operatively connected to the brake pedal push rod 13 causes the motor 7 to operate and rotate the motor shaft 88 to apply a motor assist force to the worm 86, which rotates the worm 86 and ultimately the pinion gear 85 and is applied to the hollow rack 87 to translate the hollow rack 87 along the longitudinal axis 32. The motor assist force may be stepped up or stepped down by the transmission 84 and applied to the hollow rack 87 to assist in driving the primary piston 22 to generate a braking pressure. As configured, the motor 7 is operated to apply a motor assist force and overlay the motor assist force with the brake input force applied by an operator to the brake pedal push rod 13, thus providing an electric boost to the driver inputted brake input face.

Referring to FIGS. 1 and 2, the motor 7 may be any suitable electric motor. In one embodiment, the electric motor is a brushless direct current permanent magnet motor and can also include a motor housing (not shown) for mounting to the booster housing 11 and/or the master cylinder housing 27. The motor 7 will be sized to provide an output torque sufficient to provide a predetermined motor assist torque, which is transmitted by transmission 84 to provide the predetermined assist force to the hollow booster screw bar 15 through the ball nut assembly 18 via the belt 8. The motor 7 can be activated in the application or release direction with reference to the master cylinder 110 during a brake application or release or designed to only activate in the application direction. In one embodiment, the motor 7 and transmission 84 may be idle until a motor assist force or boost is needed. In one embodiment, the transmission 84 may be permitted to "freewheel" or is otherwise allowed to freely rotate until the motor 7 is actuated.

The drive pulley 82 of transmission 84 may be mounted upon motor shaft 88 that extends from motor 7. The belt 8 is wrapped from the drive pulley 82 around the driven pulley 83. Driven pulley 83 may have any configuration suitable for attachment to or about the ball nut assembly 18, such as by surrounding or being positioned on an end of the assembly. The driven pulley 83 may be described as being drivingly engaged to the hollow booster screw bar 15. Rotation of the driven pulley 83 causes rotation of the ball nut assembly 18. Rotation of the ball nut assembly 18 causes linear movement of the hollow booster screw bar 15 (which incorporates an anti-rotation feature (not shown)) and the hollow end portion 70 of primary piston 22 that is coupled to it as well as secondary piston 2 along the longitudinal axis 32, as described herein. As configured, responsive to rotation of the ball nut assembly 18 about the longitudinal axis 32, the hollow booster screw bar 15 is arranged to translate relative to the ball nut assembly 18 to actuate at least one of the primary piston 22 and the secondary piston 2. In this manner, actuation of the motor 7 causes a booster assist force to be applied to the primary piston of the master cylinder 110. In one embodiment, the transmission 84, including the ball nut assembly 18 and hollow booster screw bar 15, as well as pulleys 82, 83, is "back-drivable" or can be driven in reverse, such as by operation of booster return spring 21.

The controller 130 may be any suitable motor controller, and in one embodiment is configured to command a predetermined motor output torque based on a suitable input signal from force sensor 14 or travel sensor 28. Controller 130 may be incorporated into any suitable electronic control module (ECM) within the vehicle in any suitable manner or may be integrated with the motor 7. This may include as an ECM specifically dedicated to the control of the electric booster and master brake cylinder assembly 100, and in one embodiment may include a dedicated ECM disposed on or within booster housing 11 and/or master cylinder housing 27. In one embodiment, the ECM may be a distributed ECM and controller 130 may be one of a plurality of controllers incorporated therein, and in another embodiment, the distributed ECM may be disposed in another portion of the vehicle physically remote from the electric booster and master brake cylinder assembly 100 and connected thereto by a suitable signal communications means. The force sensor 14 is configured to provide a signal indicative of the brake input force being applied to the pedal pushing rod 13 by an operator through a brake pedal that is pivotally connected to a brake pedal end 90 of the brake pedal push rod 13 to the controller 130.

The brake pedal push rod 13 includes the brake pedal end 90, an enlarged actuation end 92 disposed opposite the brake pedal end 90, a protrusion 93, and a shoulder 94. The enlarged actuation end 92 is slidably disposed within the plunger 9. The protrusion 93 extends from the enlarged actuation end 92 towards the end of the plunger 81. The shoulder 94 is disposed proximate the brake pedal end 90 and radially extends from the brake pedal push rod 13. A control spring 12 extends between and engages the shoulder 94 and the booster housing 11 to bias the brake pedal push rod 13 towards an extended position.

The enlarged actuation end 92 may have any suitable cross-sectional shape that enables slidable disposition within the plunger bore 95 of the plunger 9, and in one embodiment may include a cylindrical cross-sectional shape, including a right cylindrical cross-sectional shape. The enlarged actuation end 92 and control spring 10 are enclosed and slidably disposed within axially-extending plunger bore 95. The control spring 10 extends between and engages the enlarged actuation end 92 and the end of the plunger 81. The protrusion 93 is at least partially received within or extends into the control spring 10.

The plunger 9 is sealably and slidably disposed within the inner surface 77 and inner diameter of the hollow end portion 70 within plunger cavity 78. The plunger 9 has a cylindrical cross-sectional shape and extends between a first end 96 disposed adjacent to the enlarged actuation end 92 and a second end 97.

The first end 96 includes a shoulder having an inwardly extending portion 96a and an outwardly extending portion 96b. The inwardly extending portions 96a extends towards the longitudinal axis 32 and may engage a portion of the enlarged actuation end 92 that is disposed opposite the protrusion 93. The outwardly extending portion 96b extends away from the longitudinal axis 32 towards the inner surface 77 of the hollow end portion 70 of the primary piston 22. The second end 97 includes an outwardly extending shoulder 97a that extends from the end of the plunger 81 towards the inner surface 77 of the hollow end portion 70 of the primary piston 22. The end of the plunger 81 defines a notch 81a that extends from the second end 97 towards the first end 96 along the longitudinal axis 32.

Each of the ends 96, 97 includes at least one seal recess 98 in the outer surface 99 of the plunger 9 that is configured to receive a corresponding plunger o-ring seals 17. The seal recess 98 of the first end 96 is at least partially defined by the outwardly extending portion 96b and the outer surface 99. The seal recess 98 of the second end 97 is at least partially defined by the outwardly extending shoulder 97a and the outer surface 99. The plunger o-ring seals 17 are configured to provide a fluid seal between inner surface of the hollow end portion 70 and the outer surface 99 of the plunger to promote the sliding of the plunger 9 within the inner diameter of hollow end portion 70 and prevent fluid 40 from filling the plunger cavity 78.

The ends 96, 97 proximate the recess 98, together with the seals 17, act as a bushing and help to maintain the axial alignment between the brake pedal push rod 13 and the inner surface 77. In one embodiment, the plunger 9 may include a body portion 101 extending between the ends 96, 97 where the cross-section or outer diameter of the ends is larger than the cross-section or outer diameter of the body portion 101. As such, the body portion 101 does not contact the inner surface 77 and inner diameter of the hollow end portion 70, thereby decreasing the amount of sliding friction between the plunger 9 and the inner surface 77 and reducing the axial brake input force needed to move the plunger 9 within the inner surface 77. To reduce the friction between screw bar 15 and plunger 9, there are two low friction bushing rings clamped outside plunger 9.

The brake pedal push rod 13 is configured to receive a brake input force (DIF) through a brake pedal that is pivotally connected to the brake pedal end 90. The DIF causes the enlarged actuation end 92 of the brake pedal push rod 13 to be displaced into the plunger bore 95 (leftward in FIGS. 1 and 2) thereby compressing the control spring 10 and compressing the control spring 12.

The displacement of the brake pedal push rod 13 along the longitudinal axis 32 causes the plunger 9 to be displaced within the plunger cavity 78 and leads to displacement of the primary piston 22. The displacement or change of position of the brake pedal push rod 13 is sensed by a relative position or travel sensor 28 that is disposed on the brake pedal push rod 13 and/or the booster housing 11. The travel sensor 28 is arranged to provide a signal indicative of displacement of the brake pedal push rod 13 along the longitudinal axis 32 to the controller 130. The distance that the control spring 10 is compressed is proportional to the brake input force applied to the brake pedal by the driver of the vehicle.

The travel sensor 28 may provide a signal to the controller 130. The signal may be indicative of displacement of the brake pedal push rod 13, a position or a change in position of the brake pedal push rod 13, or a position of the enlarged actuation end 92 relative to the plunger 9. The controller 130 may determine the brake pedal input force based on a pre-set spring ratio and the signal. In at least one embodiment, a force sensor 14 may be disposed on the shoulder 94 of the brake pedal push rod 13. The force sensor 14 may provide a signal indicative of a brake pedal input force to the controller 130.

The controller 130 is configured to provide as an output, a motor assist force (MAF) output signal to the motor 7, based on the signal provided by at least one of the travel sensor 28 and the force sensor 14, to command an assist torque based on a pre-calibrated assist curve that relates a motor assist torque to the pedal input force (e.g. DIF). The motor 7 is then operated based on the MAF output signal to provide an assist torque to the transmission 84 that applies a torque to the ball nut assembly 18 that is translated into a pushing or linear force by the hollow booster screw bar 15 or hollow rack 87 to at least one of the primary piston 22 and the secondary piston 2 to aid in pressurizing the fluid 40 and generate brake pressure. An additive MAF is generated through the hollow booster screw bar 15 and the hollow end portion 70 or the hollow rack 87 to the master cylinder 110, including pistons 22, 2. The sum of the DIF and MAF is the total braking force available for actuation of the master cylinder, including pistons 22, 2 and power for actuation of the remainder of the brake components of braking system, as described herein. As such, the brake input force (DIF) and the Motor Assist Force (MAF) are overlaid together to push at least one of the primary piston 22 and the secondary piston 2 of the master cylinder 110 along the longitudinal axis 32. Certain advantageous operational features of the operation of the electric booster and master brake cylinder assembly 100 are provided below.

In the electric booster and master brake cylinder assembly 100, the hollow screw bar 15 and primary piston 22 or the hollow rack 87 and primary piston 22 are advantageously connected or coupled together as one piece. Motor 7 assist torque based on the DIF can be transferred through the transmission 84, to drive the pistons 22, 2 and generate brake pressure that is boosted or increased by the MAF, such that the brake pressure in the master cylinder 110 and brake system is the result of the sum of the DIF and MAF.

As a driver depresses the brake pedal, the brake pedal push rod 13 will translate along the longitudinal axis 32. The plunger 9 is designed to contact the primary piston 22 when the electric booster and master brake cylinder assembly 100 is initiated. The brake pedal push rod 13 may compress the control spring 12 between the shoulder 94 and the booster housing 11 and the brake pedal push rod 13 may compress the control spring 10 between the brake pedal push rod 13 and end of the plunger 81. The spring force of the control spring 10 is transferred to primary piston 22 to move the primary piston 22 along the longitudinal axis 32 further into the piston bore 30 of the master cylinder 110 based on the DIF. To limit the compression of the control spring 10 to avoid its damage, the protrusion 93 acts as a stop structure. The stop structure (protrusion 93) may contact the end of the plunger 81 to limit or inhibit further compression of the control spring 10 and the DIF will be transferred directly from the brake pedal push rod 13 to the plunger 9.

As the driver releases the brake pedal, the brake pedal push rod 13 is pushed towards an extended position along the longitudinal axis 32 by the control spring 12 and/or the control spring 10. The travel sensor 28 provides a signal indicative of a reduced DIF to the controller 130 based upon which the controller 130 commands the motor 7 to reduce the MAF. Because the hollow booster screw bar 15 and the ball nut assembly 18 are back drivable, the MAF and the DIF reduce together and the system pressure that was generated by at least one of the primary piston 22 and the secondary piston 2 aids in pushing the brake pedal push rod 13 towards the extended position along the longitudinal axis 32.

The travel sensor 28 may be alternatively attached to the plunger 9 to sense the relative movement between the brake pedal push rod 13 and plunger 9, which corresponds to the amount of compression of the control spring 10. Since the control spring 10 has a predetermined or pre-set spring ratio, the amount of compression of the control spring 10 is proportional to the force applied by driver (DIF) on the brake pedal push rod 13, and the output signal of the travel sensor 28 comprises the DIF signal into the controller 130.

In normal operating conditions or a normal or nominal operating mode of the electric booster and master brake cylinder assembly 100, the controller 130 will read the sensed DIF signal input and command the motor 7 to generate an assist torque accordingly. This motor torque will be transferred into an axial or linear force on the hollow screw bar 15 or hollow rack 87. Then both DIF through brake pedal push rod 13 and MAF through the hollow screw bar 15/hollow rack 87 and hollow end portion 70 of primary piston 22 are applied together on primary piston 22. Since the brake hydraulic counter force on the master cylinder 110 may be constant as long as the piston movement remains the same, the more motor assist force, the less brake input force needed, and vice versa.

When the electric booster and master brake cylinder assembly 100 is operating in a mode in which motor 7 does not provide the desired MAF, the transmission 84 is configured to be back-drivable, the driver can still push the piston ahead by applying force to piston through pushing rod, control spring and plunger.

An important and advantageous feature in the electric booster and master brake cylinder assembly 100 is that the hollow booster screw bar 15 or hollow rack 87 transfers the MAF to primary piston 22 by being directly coupled thereto through hollow end portion 70 and also allow the DIF to be transferred to the primary piston 22 by also having the brake pedal push rod 13 sliding within the hollow end portion 70 and the hollow booster screw bar 15 or hollow rack 87. In one embodiment, the brake pedal push rod 13, plunger 9, hollow end portion 70, hollow rack 87 or hollow booster screw bar 15 and ball nut assembly 18, and pistons 22, 2, and their associated springs are disposed substantially concentrically, including concentrically, on the longitudinal axis 32.

The selection of the various predetermined springs described herein determines the overall response characteristics and capabilities of the electric booster and master brake cylinder assembly 100 is an important feature of the present disclosure, including the deceleration characteristics achievable with a braking system that incorporates the assembly. Since the electric booster and master brake cylinder assembly 100 is useful in many vehicle configurations ranging from vehicles that are solely gas or diesel powered systems that only require braking to electric vehicles that incorporate regenerative braking and/or blended braking comprising regenerative and hydraulic braking, the system braking requirements and capabilities may vary considerably. This requires selection of spring components with predetermined sizes and spring rates that are configured to provide the predetermined system braking performance.

The embodiment of electric booster and master brake cylinder assembly 100 shown in FIG. 1 is useful for vehicles that employ regenerative or blended braking where the braking is done in whole or in part, respectively, by electric drive propulsion motor. The simulator piston 4 and simulator spring 5 are disposed in a simulator housing 105 that together comprise a simulator 107.

The simulator housing 105 and simulator piston 4 are in fluid communication with booster balance cavity B. The simulator 107 may be employed during regenerative braking or blended braking, for example, to provide a pedal counterforce against the plunger 9 through the fluid 40 in plunger balance cavity A. The simulator 107, including the simulator spring 5 and simulator piston 4, and balance orifice 6 can be selected to provide a predetermined balanced fluid pressure within balance cavities A, B and counterforce against plunger 9 to regulate movement of the primary piston 22 and/or the secondary piston 2. The counterforce against plunger 9 is fed back through the brake pedal push rod 13 to provide a predetermined force feedback to a driver during regenerative braking. The embodiment of electric booster and master brake cylinder assembly 100 shown in FIG. 2 is useful for vehicles utilizing hydraulic braking. Since the force feedback characteristic needed during regenerative or blended braking is not required, a simulator 107 and balance orifice 6 are not needed, and in certain embodiments not employed, and the balance cavities A, B are not filled with fluid.

The electric booster and master brake cylinder assembly 100 and components described herein may be selected to achieve a predetermined system response characteristic, including a predetermined relationship of braking deceleration available as a function of brake pedal travel, which corresponds to the travel of the brake pedal push rod 13. The response characteristic may be directly proportional and essentially linear over certain predetermined ranges of pedal travel. The deceleration performance of electric booster and master brake cylinder assembly 100 can also be correlated to the driver or pedal force input (DIF).

An exemplary embodiment of a method for controlling the electric booster and master brake cylinder assembly 100 described herein is provided in FIG. 4. The assembly 100 can be modelled as a network of sprung masses and compliances or spring rates and controlled using an open control loop methodology as illustrated in FIG. 4. The driver input may be: pedal travel (S1) and pedal force (Fp). The system sensors may monitor the pedal travel, the pedal force, the brake pressure force (P), and primary piston travel (S2). The control target is a desired deceleration (a) which has a pre-set relationship with Pedal Travel (S1): a=f1(S1). The Friction (aF) deceleration is calculated as: aF=a−Reg_a, where Reg_a=Message from Vehicle. The Desired Deceleration (a) also has a pre-set relationship with pedal counterforce, where Pedal Counter Force (CFp): a=f2(CFp). The system controls the Motor Assist Force (Fa) that has a fixed relationship with motor output torque. The system also has various natural relationships: Brake Pressure Force (P)=f3 (Piston Travel S2)=f4(aF); K21=f5(S2); K23=f6 (S2); K25=f7(S2); K12=f8(S1); and K10=f9(Delta S between plunger and rod). Where K10 is the spring constant of the control spring 10, K12 is the spring constant of the control spring 12, K21 is the spring constant of the booster return spring 21, K23 is the spring constant of the primary piston return spring 23, and K25 is the spring constant of the secondary piston return spring 25. In at least one embodiment, K12 is less than K10. The motor assist force (Fa) may be based on the following relationship: Fa=K21+K23+P−K10=K21+K23+K12+P−CFp.

The electric booster and master brake cylinder assembly 100 also may be employed in vehicles that are configured for autonomous or semi-autonomous operation and control, and which require an advanced or autonomous braking system, since the MAF may be applied by the controller in response to any suitable signal, including a signal other than a DIF signal, that commands application of a MAF. Thus, the MAF may be applied alone as described herein.

The piston bore 30, ball nut assembly 18, pulley ratio of pulleys 82, 83 or ratio between the worm gear, the worm 86, and pinion 85 may be selected to balance the speed and torque of the motor 7 and required output characteristics of the motor 7 to achieve the desired assembly performance, including braking deceleration, depending on the characteristics of the components of the braking system of the vehicle.

The electric booster and master brake cylinder assembly 100 may have various functional or operational modes that may include regenerative braking, blended braking, friction braking, and emergency braking. The failsafe features of the electric booster and master brake cylinder assembly 100 still perform their functions during the various functional or operational modes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description.

Having thus described the present disclosure, it is claimed:

1. An electric brake boost assembly, comprising:
a master cylinder including a primary piston slidably positioned within a piston bore of a master cylinder housing;
a ball screw assembly arranged to actuate the primary piston in response to actuation of a motor that is drivably connected to the ball screw assembly, the ball screw assembly being arranged about a longitudinal axis and comprising a ball nut assembly rotatably disposed about a hollow booster screw bar, the hollow booster screw bar defining a bore that receives a hollow end portion of the piston;
a plunger slidably disposed within the hollow end portion of the piston, the plunger defining a plunger bore having a control spring disposed therein; and
a brake pedal push rod being slidably disposed within the plunger bore, the control spring engaging an end of the brake pedal push rod and an end of the plunger, the brake pedal push rod configured to apply a brake input force to the piston independently of the ball screw assembly.

2. The assembly of claim 1, wherein a balance cavity is defined by an outer surface of the hollow booster screw bar and an outer surface of the primary piston.

3. The assembly of claim 2, wherein the hollow end portion includes a balance orifice.

4. The assembly of claim 3, further comprising:
a simulator having a simulator housing that is in fluid communication with the balance cavity, wherein the simulator and the balance orifice provides a predetermined balanced fluid pressure to regulate movement of the primary piston.

5. The assembly of claim 4, further comprising:
a fixing and release mechanism inserted between the hollow booster screw bar and the hollow end portion.

6. The assembly of claim 4, further comprising:
a transmission that is operatively connected to the ball nut assembly and the hollow booster screw bar, the transmission being drivably connected to the motor.

7. The assembly of claim 6, wherein responsive to operation of the motor, the transmission causes the hollow booster screw bar to translate along the longitudinal axis to actuate the primary piston.

8. The assembly of claim 6, wherein the transmission, comprising:
a drive pulley disposed about a motor shaft that extends from the motor;
a driven pulley operatively connected to the ball nut assembly; and
a drive belt operatively connected to the drive pulley and the driven pulley.

9. The assembly of claim 8, wherein the transmission, wherein the driven pulley is disposed about the ball nut assembly.

10. The assembly of claim 8, further comprising:
a controller in communication with a travel sensor disposed on the brake pedal push rod that is arranged to provide a signal indicative of displacement of the brake pedal push rod along the longitudinal axis, the controller being programmed to command the motor to operate to provide a motor assist force based on the signal.

11. An electric brake boost assembly, comprising:
a master cylinder housing defining a piston bore that axially extends along a longitudinal axis;
a booster housing connected to the master cylinder housing, the booster housing defining a bore that axially extends along the longitudinal axis;
a primary piston slidably positioned within the piston bore and having an axially extending end portion that extends into the bore, the end portion includes an inner surface that defines a plunger cavity that receives a plunger;
a ball screw assembly that is at least partially disposed within the bore of the booster housing, the ball screw assembly comprising:
a ball nut assembly that is rotatably disposed on a hollow booster screw bar that is disposed about the axially extending end portion;
a motor disposed on at least one of the booster housing and the master cylinder housing;
a transmission being drivably connected to the motor, the ball nut assembly, and the hollow booster screw bar;
a brake pedal push rod that extends through a first opening of the booster housing along the longitudinal axis and extends into a plunger bore of the plunger, the brake pedal push rod includes an enlarged actuation end that is slidably disposed within the plunger bore; and
a control spring disposed within the plunger bore and engaging the enlarged actuation end and an end of the plunger.

12. The assembly of claim 11, further comprising:
a travel sensor disposed on at least one of the brake pedal push rod and the booster housing, the travel sensor being arranged to provide a signal indicative of a position of the brake pedal push rod to a controller.

13. The assembly of claim 12, wherein the controller is programmed to operate the motor based on the signal to rotate the ball nut assembly about the longitudinal axis.

14. The assembly of claim 13, wherein the hollow booster screw bar is arranged to translate relative to the ball nut assembly along the longitudinal axis to actuate the primary piston responsive to rotation of the ball nut assembly about longitudinal axis.

15. The assembly of claim 11, wherein the transmission extends at least partially through an opening defined between the booster housing and the master cylinder housing.

16. An electric brake boost assembly, comprising:
a master cylinder housing defining a piston bore that axially extends along a longitudinal axis;
a booster housing connected to the master cylinder housing, the booster housing defining a bore that axially extends along the longitudinal axis;

a primary piston slidably positioned within the piston bore and having an axially extending end portion that extends into the bore;

a ball screw assembly that is at least partially disposed within the bore of the booster housing, the ball screw assembly comprising:

a ball nut assembly that is rotatably disposed on a hollow booster screw bar that is disposed about the axially extending end portion; and a fixing and release mechanism inserted between the hollow booster screw bar and the end portion.

17. The assembly of claim 16, wherein an inner surface at least partially defines a plunger balance cavity and an outer surface of the primary piston at least partially defines a booster balance cavity.

18. The assembly of claim 17, wherein the axially extending end portion includes a balance orifice enables transfer of fluid between the plunger balance cavity and the booster balance cavity.

* * * * *